United States Patent [19]
Haupt

[11] 3,906,440
[45] Sept. 16, 1975

[54] ENGINE WARNING DEVICE

[76] Inventor: Albert J. Haupt, 222 Junipero Ct., Capitola, Calif. 95010

[22] Filed: Nov. 21, 1973

[21] Appl. No.: 417,737

[52] U.S. Cl. ................ 340/52 F; 307/10 R; 340/60
[51] Int. Cl.² ........................................... B60Q 5/00
[58] Field of Search ............ 340/27, 52 R, 52 F, 60, 340/57, 213, 240, 412, 414, 415, 65; 307/10 R, 39, 218, 252 R, 252 L, 252 K, 252 H; 180/103; 73/116, 117.3

[56] References Cited
UNITED STATES PATENTS

| | | | |
|---|---|---|---|
| 3,271,736 | 9/1966 | Brown et al. | 340/52 F |
| 3,631,388 | 12/1971 | Strong | 340/60 |
| 3,659,133 | 4/1972 | Wagner | 180/103 |
| 3,706,088 | 12/1972 | Jorgensen | 340/213 R |
| 3,755,778 | 8/1973 | Kennedy et al. | 340/65 |

Primary Examiner—John W. Caldwell
Assistant Examiner—Joseph E. Nowicki
Attorney, Agent, or Firm—Robert G. Slick

[57] ABSTRACT

Engines are frequently provided with a low oil pressure warning light which operates from a normally closed pressure actuated switch so that the light comes on when the ignition switch is initially turned on and remains on until the engine has built up sufficient oil pressure to open the pressure actuated switch, whereupon the light is extinguished. If the oil pressure subsequently drops, the light goes back on. The present invention provides an audible warning device which does not sound when the light initially goes on, but should the light go off, and then come on again, indicating a dangerous condition, the audible warning sounds. The device of the present invention can be combined with additional warning lights which do not normally go on when the engine is first started, but which go on subsequently if trouble develops.

2 Claims, 1 Drawing Figure

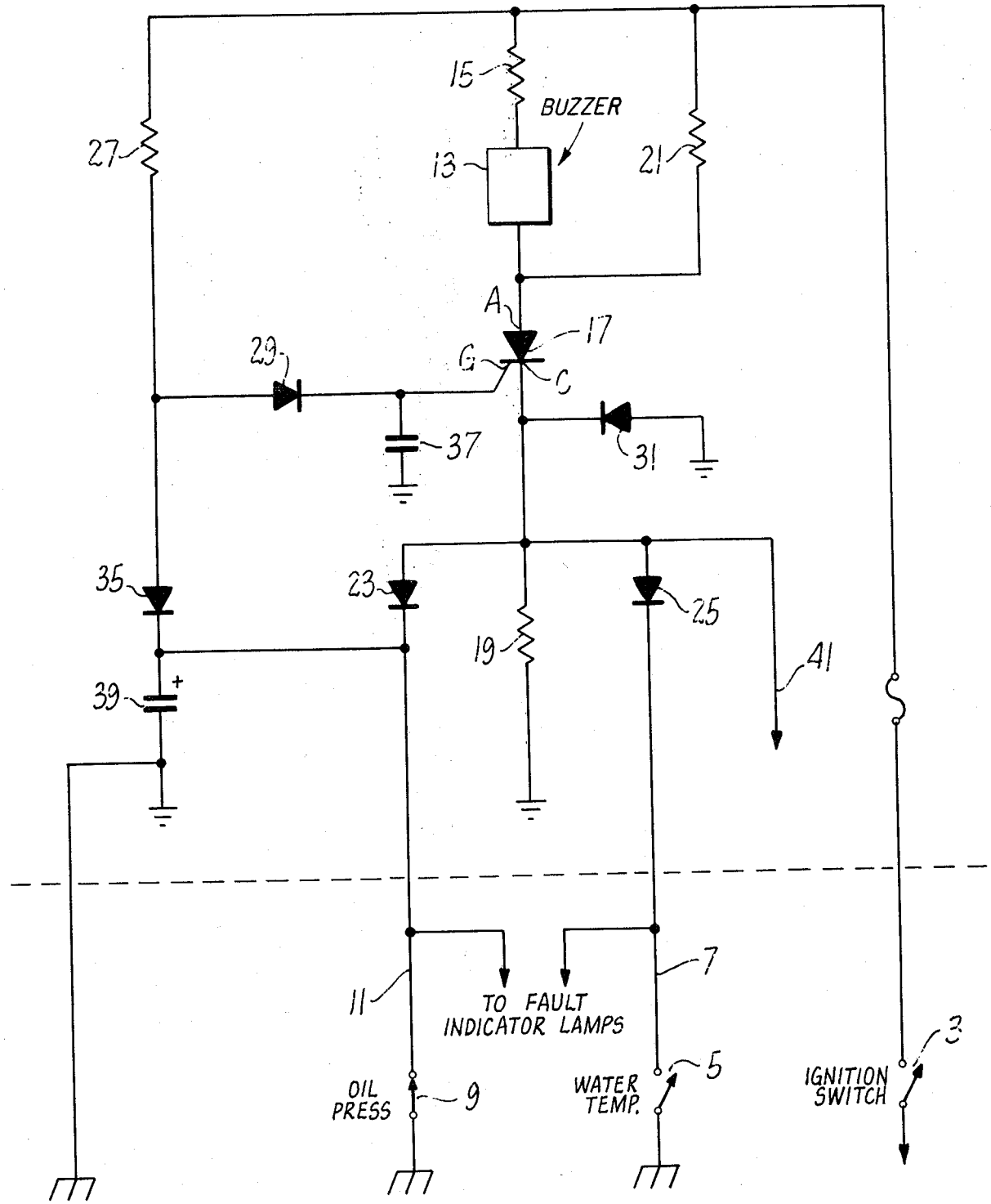

ENGINE WARNING DEVICE

SUMMARY OF THE INVENTION

Warning lights are frequently used in combination with gasoline engines wherein a light comes on to warn of some difficulty such as low oil pressure or high water temperature. Unless one is watching closely, it is easy to miss such a warning light, particularly on a boat or stationary engine where one's attention is not concentrated on a dashboard.

The device of the present invention provides an audible warning so that the user's attention is immediately called to the fact that there is some trouble so that he will then glance at the dashboard to see what the trouble is.

Such devices have been proposed in the past, but they have suffered from the deficiency that the warning may be sounded when there is no actual trouble such as when the motor is first started. The reason for this is that some of the switches, such as oil pressure, are normally closed while others such as water pressure are normally open. Thus, when the auto is first started, the oil pressure warning light goes on until such time as the engine has achieved sufficient speed to build up oil pressure extinguishing the light. During this period, the light does not indicate a real source of trouble, and it would be annoying to the operator to have the audible warning sound. Further, an audible warning at this time might mask another audible warning such as the fact that seatbelts are not fastened.

In accordance with the present invention, a solid-state device is provided so that a warning is sounded if one of the trouble lights should light up. However, the circuit provides that no audible warning will be sounded during the initial starting period when a light, such as the oil warning light, may come on but wherein there is no real trouble with the operation of the engine. I am aware that others have proposed similar devices, but they have ordinarily involved various mechanical arrangements such as relays and are thus much less reliable than the fully solid state warning device of the present invention.

In general, the invention is carried out by providing a siliconcontrolled recitifier (SCR) which does not "fire" until the oil pressure switch has been opened, at which point there is sufficient resistance in the circuit to keep SCR in its conducting state, but insufficient current passes to sound the audible warning device. Upon the closing of one of the warning switches thereafter, the resistance is shorted out, increasing the current, causing the audible warning to sound.

BRIEF DESCRIPTION OF THE DRAWING

The sole FIGURE of the drawing is a schematic diagram of a warning device embodying the present invention.

DESCRIPTION OF THE PREFERRED EMBODIMENTS

Referring now to the drawings by reference numbers, there is shown a warning device for attachment to an ordinary internal combustion engine. Everything below the dash line is a standard component of an existing vehicle, and the warning device of the present invention consists of the components and circuitry above the dash line. Thus there is shown an ignition switch 3 which normally would be connected to a battery (not shown), a normally open water temperature switch 5, having a line 7 leading to a water temperature warning light, and a normally closed oil pressure switch 9, having a line 11 leading to a low pressure indicator lamp. As is well known to those still in the art, the water temperature switch 5 is normally open and closes if an excessive temperature is reached by the engine, lighting the corresponding warning light. On the other hand, the oil pressure switch 9 is normally closed, and the light goes off when normal oil pressure is reached, and goes on again should there be a failure in the system whereby the oil pressure is reduced to an unsafe level while the engine is running. It will be understood, of course, that the opposite terminal of each indicator lamp will go to the hot side (normally positive) of the battery and that the lights will light when line 7 or 11 is grounded.

In accordance with the present invention, an audible warning device 13 is provided which can be in the form of a buzzer, or bell or oscillator with loudspeaker, although the device will be further referred to as a buzzer. The buzzer is wired to the ignition switch line, preferably through a current-limiting resistor 15, suitably of about 20 ohms, and is routed through SCR 17 and a resistor of relatively high value 19, suitably 100 ohms. A shut resistor 21 around resistor R15 and the buzzer 13, suitably of 100 ohms, can be provided to insure that SCR will remain conducting after it has once fired. Resistor 19 is sufficiently high in value that when it is in the circuit, insufficient current passes from buzzer 13 to cause it to sound, even if SCR 17 is conducting. Resistor 19 is shunted to ground through switches 9 and 5 if either of these switches is closed. In both instances, the path goes through diodes, as at 23 and 25, to the individual warning lights so that if one light comes on, no path will be provided to light the other light. Resistor 27 connects the gate of SCR to the hot line and serves as a limiting resistor to limit the gate current to the proper level. This resistor can suitably be 2.7 K ohms. Diode 29 prevents gate-to-anode conduction by SCR 17. A diode 31 can be provided to prevent any negative switching transients from prematurely firing SCR 17 while a diode 35 provides an initial ground path through switch 9. The capacitors 37 and 39 prevent switching transients and ignition noise from prematurely firing SCR 17. An extra line or lines 41 can be provided to additional fault indicators, and, of course, this would normally be isolated with one or more diode similar to 23 and 35.

It is believed that the theory of operation is now readily apparent. When the ignition switch is off and the engine is cold, switches 3, 5 and 9 will be as shown in the drawing, and, since no voltage is applied to buzzer 13, it will not sound. Now when ignition switch 3 is initially closed, but before the engine is started, 12 volts is applied to the alarm 13, but since switch 9 is closed, the resulting current flow through swtich 9, diode 35, and resistance 27 causes a very little voltage to appear at the gate G of SCR 17, i.e., the gate is essentially grounded. The lack of voltage at the gate keeps SCR from firing so that it remains in the nonconducting state and consequently the buzzer 13 does not sound. Now when the engine is started and operating, the oil pressure will rise, causing switch 9 to open, thereby removing the low potential from the gate of SCR as well as removing the short from across resistor 19. The gate of SCR is now high enough, positive, to cause SCR to conduct, allowing current to flow from ground to resistor 19, the SCR, buzzer 13 and resistor 15. However, this current is limited by the relatively high resistance of resistor 19 to about 100 ma, which is insufficient to cause buzzer 13 to sound. The circuit remains in this condition throughout normal engine operation, with SCR conducting, but with the buzzer not sounding because of the relatively high resistance in series with it.

Switches 9 and 5 are now both open, and should the oil pressure drop, closing switch 9, or the temperature rise, closing switch 5, or conceivably both, resistor 19 will be shorted to ground through diodes 23 and/or 25. It will be remembered that the SCR 17 is in the conducting condition (and it will continue to conduct even if the gate is grounded), and the shorting of the resistor 19 will cause the current to rise to about 300 ma, which is sufficient to cause the buzzer 13 to sound. The operator's attention is immediately directed to the engine, and he will be aware that one or both of his trouble lights is on. Although the closing of one of the switches 5 and 9 places the gate of SCR 17 at a low potential, the SCR has already fired and is conducting so that lowering the gate potential at this point has no effect, so that the buzzer will continue to sound despite the fact that the gate is now grounded. Once the alarm has sounded, the only way to stop the audible alarm is to turn off ignition switch 3 or to correct the trouble so that switches 5 and 9 are in the open position.

A number of variations can be made in the exact structure shown without departing from the spirit of this invention. For instance, the invention has been described in conjunction with two warning switches, one normally open, one normally closed. It is obvious that the invention would be operative in any situation wherein a normally closed warning switch is employed, which switch opens during normal operation and closes in case of trouble, e.g., an engine having only the oil pressure warning.

Resistor 15 can be eliminated by the proper selection of the audible warning device. Also, resistor 21 is only necessary with those warning devices wherein the circuit is interrupted, as in a buzzer, and could be eliminated if a warning device is used which does not periodically interrupt the circuit such as a transistor oscillator and loudspeaker.

It is believed apparent from the foregoing that I have provided a simple solid state circuit which will sound an audible alarm in case a trouble indicator light indicates an actual source of trouble in an engine but which will not give a false audible signal when the engine is first started when the normally closed oil pressure switch will cause the oil pressure light to light.

I claim:

1. In an audible warning system for an engine having a first switch, said switch being off when the engine is off and being on when the engine is running, and having a second switch connected to a warning light, said second switch being normally closed and remaining closed when said engine is first started, and opening, extinguishing said light, when the engine reaches operating speed, said second switch reclosing and turning said light on when a dangerous condition in the engine exists, the improvement comprising:
   a. an audible device, said audible device being connected to said first switch in series with an SCR having the usual gate and having a first resistor, said first resistor being in parallel with said second switch,
   b. said first resistor being of sufficiently high value to prevent said audible device from sounding when it is in series therewith,
   c. a second resistor in parallel with said audible device, said second resistor being adapted to provide gate current to fire said SCR and having a path to ground through said second switch,
   d. said second switch normally providing a ground path for the gate of the SCR when said switch is closed whereby said SCR will not fire,
   e. said second resistor providing gate current to fire said SCR when said second switch is opened,
   f. said audible device not being turned on when said SCR fires because of the limiting action of the high resistance of said first resistor, and
   g. said second switch shorting said first resistor when said second switch closes, causing said audible device to sound.

2. The circuit of claim 1 having a third switch of the normally open type in parallel with said second switch and a diode in series with said second switch and another diode in series with said third switch whereby said diodes isolate said second switch from said third switch.

* * * * *